Dec. 29, 1931.   W. B. FLANDERS   1,838,990
REDUCTION GEAR
Filed July 31, 1930

WITNESS

INVENTOR
W. B. FLANDERS.
BY
ATTORNEY

Patented Dec. 29, 1931

1,838,990

UNITED STATES PATENT OFFICE

WARREN B. FLANDERS, OF PHILADELPHIA, PENNSYLVANIA, ASSIGNOR TO WESTING-HOUSE ELECTRIC & MANUFACTURING COMPANY, A CORPORATION OF PENNSYL-VANIA

REDUCTION GEAR

Application filed July 31, 1930. Serial No. 472,152.

My invention relates to gearing, more particularly of the marine reduction type, and it has for an object to provide apparatus of this character wherein the pinion will have approximately equal loading at both ends when the gearing is under load.

In an ordinary reduction gear, the maximum amount of deflection, on account of torsion, takes place adjacent to the coupled end, with the result that the load on the teeth is not uniform, such load being a minimum remote from the coupling and a maximum adjacent to the coupling. In accordance with my invention, I provide a pinion having one end connected directly to the driving shaft and having means associated with the other end in order that it may be placed under initial torsional load, and this torsional load may be made equal to that of any desired load on the gearing, with the result that, when the gear load reaches a predetermined amount, the torque will be equally divided at each end of the pinion, that is, the two faces of the pinion and of the gear will be loaded equally. It is, therefore, a further and more specific object of my invention to provide a driving pinion coupled at one end to a driving shaft and having means associated with the other end for placing the latter under initial torque or torsional load.

Figure 1:
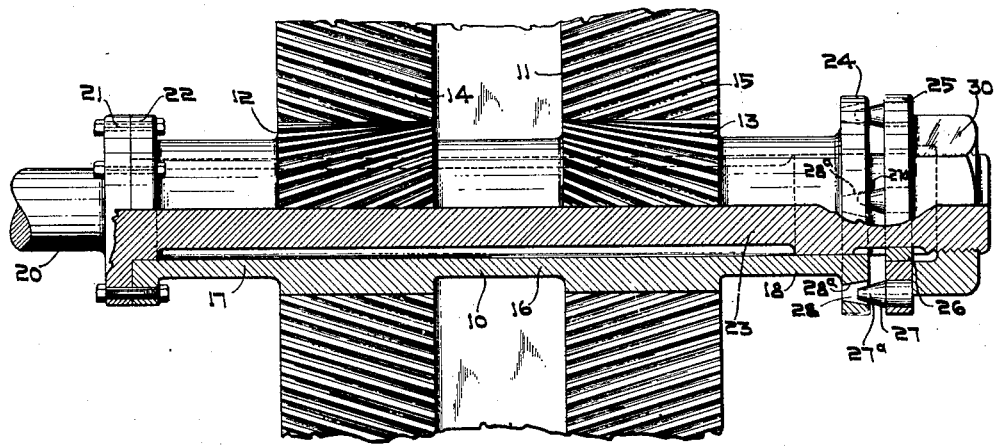
Figure 2:
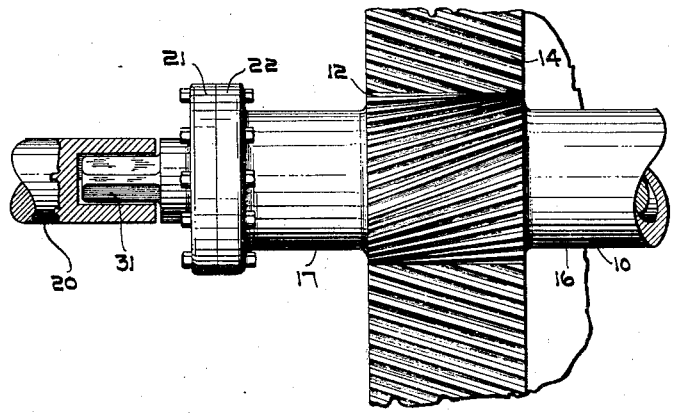

These and other objects are effected by my invention, as will be apparent from the following description and claims taken in connection with the accompanying drawings, forming a part of this application, in which:

Fig. 1 is a view, partly in elevation and partly in section, showing my improved driving pinion; and, Fig. 2 shows a modified form of connection of the pinion to the driving shaft.

Referring now to the drawings, more in detail, I show a reduction gear including a driving pinion 10 and a driven gear 11. The driving pinion has toothed faces 12 and 13 meshing, respectively, with toothed faces 14 and 15 of the gear 11. The pinion 10 is provided with intermediate and terminal bearing portions 16, 17 and 18. As will be immediately pointed out, the pinion 10 has torque applied thereto in such a way as to overcome the undesirable effect of concentrating the load toward one end of the pinion at a desired or running load.

A driving shaft 20 is provided with a flange 21 to which is connected the flange 22 of the pinion adjacent to the bearing portion 17 of the latter, the pinion being made hollow and having a shaft extension 23 extending therethrough. The shaft extension 23 extends beyond the other end of the pinion and means are associated both with the remote end of the pinion and with the remote end of the shaft extension to provide for initial application of torque to such remote end of the pinion.

The remote end of the pinion adjacent to the bearing portion 18 is preferably provided with a flange 24 beyond which extends the shaft extension 23, and the shaft extension 23 has a disc or flange member 25 connected thereto by a slidable key 26 and it is provided with lugs or pins 27 having inclined faces 27a arranged to cooperate with inclined faces 28a provided by openings 28 in the flange 24.

As shown in Fig. 1, if the disc or flange member 25 is moved toward the pinion, the inclined faces 27a and 28a of the lugs or pins 27 and of the openings 28, respectively, cooperate to impart an initial twist to the shaft extension 23. Movement of the disc 25 axially of the pinion and away from the flange 24 results in relief of this twist. The pins or lugs 27 and the openings 28 are placed in such alignment by the key 26 that, when the flange or disc 25 is moved axially toward the pinion, the inclined sides of faces 27a of the lugs or pins 27 press against the inclined sides 28a of the openings 28 in the flange 24, producing the desired degree of torsion in the shaft extension 23. This torsion may be made equal to that of any desired load on the gear, so that, when the load equals the desired amount, the torque will be equally divided between the two pinion faces 12 and 13. Any suitable means may be used for securing axial movement of the flange 25 with respect to the shaft extension, and I show, by way of example, a nut 30 carried by the shaft extension and serving this purpose.

If it is desired to have the pinion move bodily to get better contact of the pinion and gear teeth, a slidable coupling 31 may be provided between the driving shaft and the pinion, this construction being shown in Fig. 2.

From the foregoing, it will be apparent that I have provided a pinion which overcomes the disadvantage of unequal loading from end to end on account of torsional deflection, particularly at a desired or normal load, this effect being obtained by subjecting the shaft extension to initial torsional stress or deflection which is applied to the remote end of the pinion. If it is assumed that the gear is to transmit a predetermined or normal load, then the shaft extension may be deflected torsionally to such an extent that the torque applied to each end of the pinion at the predetermined and normal load is the same in which case the teeth will be more uniformly loaded.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In gearing, a driving quill pinion, a driving shaft extending through the pinion, a rigid coupling between one end of the pinion and the shaft, and a coupling between the other end of the pinion and the shaft and including means providing for relative angular adjustment of the latter end of the pinion and the shaft to place the pinion under desired torsional stress or load at the latter end.

2. In gearing, a gear; and a pinion structure including a hollow pinion meshing with the gear, a driving shaft coupled to one end of the pinion and extending therethrough, means providing inclined surfaces at the end of the pinion remote from the coupled end, and means having inclined surfaces in engagement with the first inclined surfaces and keyed to and movable axially of the shaft extension to bring about an initial state of stress in the pinion structure causing torque to be applied at the remote end of the pinion.

3. In gearing, a hollow pinion, a driving shaft coupled to the first end of the pinion and extending therethrough, a flange at the second end of the pinion and having a circumferential series of openings provided with inclined faces, a flange keyed to the shaft extension and having lugs provided with inclined faces engaging the inclined faces of the openings in said pinion flange, and means carried by the shaft extension for moving the keyed flange toward the pinion to place the shaft extension and the pinion under initial torsional load.

In testimony whereof, I have hereunto subscribed my name this 23rd day of July, 1930.

WARREN B. FLANDERS.